United States Patent [19]

Ueno et al.

[11] 4,309,513

[45] Jan. 5, 1982

[54] NOVEL RESIN COMPOSITIONS BASED ON POLYPHENYLENE ETHER

[75] Inventors: Katsuji Ueno, Hirakata; Haruo Inoue, Kobe; Akihiro Furuta, Takatsuki, all of Japan

[73] Assignee: Sumitomo Chemical Company, Limited, Osaka, Japan

[21] Appl. No.: 224,819

[22] Filed: Jan. 13, 1981

[30] Foreign Application Priority Data

Jan. 24, 1980 [JP] Japan ................................. 55-7548

[51] Int. Cl.$^3$ .............................................. C08L 61/04
[52] U.S. Cl. ...................................... 525/68; 525/92; 525/93; 525/94; 525/95; 525/96; 525/97; 525/132; 525/151; 525/152; 528/218
[58] Field of Search ...................... 525/68, 92, 93, 94, 525/95, 96, 97, 132, 151, 152; 528/218

[56] References Cited

U.S. PATENT DOCUMENTS

| | | | |
|---|---|---|---|
| 3,383,435 | 4/1968 | Cizek | 525/68 |
| 4,113,797 | 9/1978 | Lee, Jr. | 525/68 |
| 4,153,644 | 8/1979 | Sugio et al. | 525/92 |

Primary Examiner—J. Ziegler
Attorney, Agent, or Firm—Stevens, Davis, Miller & Mosher

[57] ABSTRACT

A resin composition based on a polyphenylene ether comprising 99 to 1 part by weight of a polyphenylene ether copolymer derived from 99.5 to 85 mole-% of 2,6-dimethylphenol and 0.5 to 15 mole-% of 3-methyl-6-tert-butylphenol and 1 to 99 parts by weight of a styrene polymer (making up 100 parts by weight in total); and said resin composition further containing 0.1 to 100 parts by weight of a rubber-like polymer for 100 parts by weight of the said resin composition. These resin compositions have excellent mechanical strength, heat resistance, and moldability and are suitable as molding resin materials in practical use fields.

13 Claims, No Drawings

NOVEL RESIN COMPOSITIONS BASED ON POLYPHENYLENE ETHER

This invention relates to a resin composition containing a polyphenylene ether copolymer and provides a resin composition which is improved in heat resistance and long-term stability to oxidation at high temperatures and is excellent in mechanical properties and processibility. Polyphenylene ethers, typically poly(2,6-dimethyl-1,4-phenylene) ether, are known as thermoplastic resins excellent in heat resistance, mechanical and electrical properties. When used alone, however, they manifest insufficient processibility and poor stability to oxidation at high temperatures. These defects have confined the use of polyphenylene ethers as an engineering resin material and a general-purpose molding material within a narrow field. As is well known, in order to overcome partly the above difficulties, the polyphenylene ether is incorporated with various resins, particularly styrene resins, and the resulting resin compositions are now being in actual use as general-purpose molding materials with improved moldability (for example, U.S. Pat. No. 3,383,435 and Japanese Patent Publication No. 17,812/1968). However, although such a resin composition has improved moldability and is formable at a lower temperature, it unavoidably becomes inferior in heat resistance or mechanical properties, which is characteristic of a polyphenylene ether.

In the field of molding materials prepared by modifying a polyphenylene ether, many attempts have heretofore been made to incorporate other resins into a polyphenylene ether, whereas very few attempts have been made to modify chemically the polyphenylene ether itself. The present inventors conducted studies on the copolymerizability of phenols in the oxidative polycondensation and, as a result, found that monomeric phenols in a specific combination show remarkably good copolymerizability and, moreover, the resulting polyphenylene ether copolymer exhibits entirely unexpectable performance characteristics.

The present inventors performed further investigations on the resin compositions comprising the above polyphenylene ether copolymer incorporated with other resins and found that a resin composition comprising a certain polyphenylene ether copolymer and a polystyrene or a styrene copolymer incorporated therein can be extremely valuable for practical use, and can be free of the aforementioned general defects of polyphenylene ethers have been eliminated. These findings have led to the present invention.

An object of this invention is to provide a novel resin composition having excellent performance characteristics comprising a polyphenylene ether copolymer and a styrene polymer with or without an additional rubber-like polymer.

Other objects and advantages of this invention will become apparent from the following description.

According to this invention there are provided a resin composition based on a polyphenylene ether comprising 99 to 1 part by weight of a polyphenylene ether copolymer derived from 99.5 to 85 mole-% of 2,6-dimethylphenol and 0.5 to 15 mole-% of 3-methyl-6-tert-butylphenol and 1 to 99 parts by weight of a styrene-base polymer (the sum of both resins being 100 parts by weight); and a resin composition based on a polyphenylene ether comprising 99 to 1 part by weight of a polyphenylene ether copolymer derived from 99.5 to 85 mole-% of 2,6-dimethylphenol and 0.5 to 15 mole-% of 3-methyl-6-tert-butylphenol and 1 to 99 parts by weight of a styrene polymer (the sum of both resins being 100 parts by weight), and 0.1 to 100 parts by weight of a rubber-like polymer for 100 parts by weight of the sum of said two resins.

The resin composition of this invention is much improved in various performance characteristics compared with known resin compositions comprising a polyphenylene ether and a styrene polymer, and there is provided a novel resin composition imparted with those performance characteristics which have never been achieved by the conventional resin compositions. The properties which characterize the present composition include heat resistance, and mechanical properties such as tensile strength, flexural strength, elongation, and impact resistance. Above all, a remarkable improvement in impact strength unaccompanied by deterioration of heat resistance greatly contributes to the expansion of the use of the composition in the field of molded articles. Because of the excellent moldability together with retained mechanical strengths and heat resistance, the resin composition of this invention is very useful as a practical molding material.

The polyphenylene ether copolymer used in the present resin composition having excellent performance characteristics is that derived from 99.5 to 85 mole-% of 2,6-dimethylphenol and 0.5 to 15 mole-% of 3-methyl-6-tert-butylphenol (hereinafter referred to as 3M6B) and has a random and/or block structure. This copolymer may be prepared by passing oxygen or an oxygen-containing gas through said monomeric phenols in the presence of a catalyst to effect oxidative polycondensation. More particularly, it may be prepared by adding the whole of a predetermined amount of 3M6B to 2,6-dimethylphenol to be subjected to the known oxidative polycondensation, or by adding one of the monomers to the other monomer undergoing the oxidative polycondensation, or by allowing each monomer to polymerize independently to a predetermined polymerization degree and then combining both reaction mixtures to continue the oxidative polycondensation.

The proportion of the structural unit derived from 3M6B in the polyphenylene ether copolymer for use in the present composition is 0.5 to 15, preferably 1 to 10, most preferably 1.5 to 5 mole-%. In particular, a copolymer containing 2 to 3 mole-% of 3M6B has especially improved in mechanical characteristics. If the proportion of 3M6B is higher than 15 mole-%, the polycondensation is likely not to proceed smoothly, the final molecular weight is not sufficiently high, and the heat resistance is deteriorated, while if the proportion is below 0.5 mole-%, characteristic features of the copolymer will not be sufficiently developed.

On comparative examination of copolymers with other alkylphenols, no improvement in physical properties as remarkable as that obtained with 3M6B was found.

The other resin component used in the present composition mixed with the polyphenylene ether copolymer is a styrene polymer. The styrene polymers, as herein referred to, include polystyrenes and styrene-based copolymers which can be used each alone or in mixtures. The polystyrenes, as herein referred to, include homo- and co-polymers of styrene and derivatives thereof (hereinafter referred to briefly as vinyl aromatic monomers), typically styrene, α-methylstyrene, vinyltoluene and chlorostyrene. The styrene-based copolymer, as herein referred to, is a copolymer resin having a polymeric structure derived from a vinyl aromatic monomer and a monomer copolymerizable therewith. Representatives of such copolymer resins are impact-resistant polystyrenes, styrene-acrylonitrile copolymer, styrene-butadiene block copolymer, styrene-butadiene random copolymer, styrene-methyl methacrylate copolymer, styrene-butadiene-acrylonitrile copolymer, styrene-maleic anhydride copolymer, rubber-modified styrene-maleic anhydride copolymer, ethylene-styrene copolymer, and ethylene-propylene-butadiene-styrene copolymer.

The vinyl aromatic monomers used in the styrene-based copolymers include styrene and derivatives thereof, as described above. The monomers copolymerizable with vinyl aromatic monomers include olefins, typically ethylene and propylene; acrylic monomers, typically acrylonitrile and methyl methacrylate; and conjugated diene monomers, typically butadiene, isoprene and chloroprene.

The rubber-like polymers used in combination with the polyphenylene ether copolymer and a styrene-based copolymer to enhance the characteristics of the resin composition include for example polybutadiene, butadiene-styrene copolymer, ethylene-propylene copolymer, ethylene-propylene-conjugated diene copolymer, polyisoprene, polyisobutylene, polychloroprene, acrylic ester copolymer, and high-styrene rubber.

The compounding ratio of the above compounds in the resin composition of this invention depends upon the type of each component such as the composition of polyphenylene ether copolymer, the type and properties of polystyrenes or styrene-based copolymers, and the intended use of the resin composition. In ordinary cases, suitable resin compositions contain 99 to 1, preferably 95 to 5 parts by weight of the polyphenylene ether copolymer and 1 to 99, preferably 5 to 95 parts by weight of a styrene-based copolymer (making up a total of 100 parts by weight).

The amount of rubber-like polymer, which is added if necessary, is desirably 0.1 to 100 parts by weight for 100 parts by weight of the resin compositions.

In practicing the present invention, any known blending techniques can be used for blending a polyphenylene ether copolymer and a styrene polymer and further a rubber-like polymer.

The resin components can be physically intermixed, for example, by dissolving the components each in a common solvent, mixing the resulting solutions, and co-precipitating the components by the addition of a precipitant, by blending the resin components together in a blender and extruding the resulting blend from an extruder or by blending the resin components by means of Bunbury's mixer or a kneader. The compounding can also be effected chemically, for example, by polymerizing, copolymerizing or graft-copolymerizing in the presence of the polyphenylene ether copolymer a vinyl aromatic monomer or a mixture of a vinyl aromatic monomer and a copolymerizable monomer, or by subjecting a mixture of 2,6-dimethylphenol and 3M6B to oxidative co-condensation in the presence of a styrene-based copolymer and subjecting the resulting mixture to co-precipitation. Polymerization or graft-copolymerization can be carried out by any of the techniques of bulk-polymerization, suspension polymerization, solution polymerization and emulsion polymerization. A rubber-like polymer can be added to the polymerization system.

The resin composition of this invention can be incorporated, if necessary, with various additives such as thermal stabilizers, pigments, fire retardants, plasticizers, lubricants, UV absorbers and colorants as well as fibrous reinforcements such as glass fiber, asbestos fiber, carbon fiber and alumina fiber. It is also possible to compound with other resin components unless the characteristics of the resin composition are injured.

The invention is illustrated below in detail with reference to Examples, but the invention is not limited thereto.

REFERENCE EXAMPLE 1

A solution containing 47.9 g of 2,6-dimethylphenol and 1.31 g of 3M6B dissolved in 196 g of xylene was placed in a 500-ml separable flask provided with an inlet tube for oxygen, a reflux condenser and a stirrer. A solution of 1.0 g of dehydrated manganese chloride in 84 g of methanol and a solution of 4.8 g of ethylenediamine, in 84 g of methanol were added into the flask. Oxygen was introduced with stirring into the reactant mixture at a flow rate of 100 ml/minute. After allowing the reaction to proceed at 30° C. for about 3 hours, the oxygen stream was turned off. The resulting reaction mixture was admixed with 17 ml of concentrated hydrochloric acid and heated with stirring at 60° C. for 1.5 hours. After cooling, the reaction mixture was poured into 1,000 g of methanol to precipitate the formed polymer which was then collected by filtration, washed with methanol and dried to obtain a polymer in a yield of 94%. The resulting polymer showed an intrinsic viscosity, $[\eta]$, of 0.55 dl/g, as determined in chloroform at 25° C., and contained about 2 mole-% of the structural unit derived from 3M6B, as determined by NMR spectroscopy.

EXAMPLE 1

A mixture comprising 40 parts of the polyphenylene ether copolymer prepared in Reference Example 1, 53.6 parts of a commercial impact-resistant polystyrene (ES-BRITE®500 A of Nippon Polystyrene Co.) and 6.4 parts of a commercial styrene-butadiene copolymer (Solprene 1204 of Showa Denko Co.) was milled by means of a Brabender Plastograph at 250° C. for 10 minutes and compression molded to obtain a molded specimen (A) having physical properties as shown in Table 1.

For comparison, another molded specimen (B) was prepared in the same manner as above, except that 40 parts of poly(2,6-dimethyl-1,4-phenylene) ether having an intrinsic viscosity, $[\eta]$, of 0.55 dl/g were used in place of 40 parts of the polyphenylene ether copolymer. The physical properties of the molded specimen (B) were as shown in Table 1.

As is apparent from Table 1, the resin composition containing a polyphenylene ether copolymer derived from 2,6-dimethylphenol and 3M6B showed substantially identical heat distortion temperature and a remarkably improved impact resistance, as compared with the resin composition containing poly(2,6-dimethyl-1,4-phenylene) ether.

TABLE I

| Physical property | Type of molded specimen | |
| --- | --- | --- |
| | A | B |
| Heat distortion temperature (°C.), (load: 18.4 kg/cm$^2$) | 111 | 113 |
| Tensile strength (kg/cm$^2$) | 535 | 560 |
| Elongation (%) | 45 | 30 |
| Flexural strength (kg/cm$^2$) | 950 | 945 |
| Izod impact strength (kg . cm/cm) (Notched; ⅛ inch) | 22 | 13 |

EXAMPLE 2

A mixture of 40 parts of a polyphenylene ether copolymer having an intrinsic viscosity, [η], of 0.58 dl/g (in chloroform at 25° C.), which had been derived from a monomer mixture of 97 mole-% of 2,6-dimethylphenol and 3 mole-% of 3M6B, and 60 parts of a commercial impact-resistant polystyrene (ESBRITE® 500 A of Nippon Polystryene Co.) was milled in a Brabender Plastograph at 250° C. for 10 minutes and compression molded. The molded specimen showed an Izod impact strength of 9 kg.cm/cm (notched; ⅛ inch).

Another compression molded specimen was prepared by using a poly(2,6-dimethyl-1,4-phenylene) ether having an intrinsic viscosity [η], of 0.60 dl/g and milling and molding in the same manner as above. Upon testing, the Izod impact strength was found to be as low as 4 kg.cm/cm.

EXAMPLES 3 to 8 and COMPARATIVE EXAMPLES 1 to 5

A mixture comprising 40 parts of a polyphenylene ether copolymer derived from 2,6-dimethylphenol and an another phenol, 53.6 parts of a commercial impact-resistant polystyrene (ESBRITE® 500 AS of Nippon Polystyrene Co.) and 6.4 parts of a styrene-butadiene copolymer (Solprene® 1204 of Showa Denko Co.) was milled and molded in the same manner as in Example 1. The molded specimen was tested for heat distortion temperature and impact strength. The results obtained were as shown in Table 2.

TABLE 2

| No. | Phenolic co-monomer | Mole-% | [η] dl/g | Heat distortion temp. (°C.) (load: 18.4 kg/cm$^2$) | Izod impact strength (kg . cm/cm) (notched; ⅛ in.) |
| --- | --- | --- | --- | --- | --- |
| Comparative Example 1 | — | — | 0.50 | 113 | 13 |
| Comparative Example 2 | 2,5-Xylenol | 2 | 0.84 | 110 | 14 |
| Comparative Example 3 | Thymol | 2 | 0.60 | 110 | 13 |
| Comparative Example 4 | Thymol | 5 | 0.50 | 104 | 14 |
| Example 3 | 3M6B | 1 | 0.80 | 112 | 15 |
| Example 4 | 3M6B | 2 | 0.60 | 111 | 24 |
| Example 5 | 3M6B | 3 | 0.52 | 111 | 22 |
| Example 6 | 3M6B | 5 | 0.50 | 111 | 17 |
| Example 7 | 3M6B | 10 | 0.65 | 107 | 15 |
| Example 8 | 3M6B | 15 | 0.55 | 104 | 13 |
| Comparative Example 5 | 3M6B | 20 | 0.31 | 96 | 6 |

EXAMPLE 9

A mixture comprising 50 parts of a polyphenylene ether copolymer having an intrinsic viscosity of 0.5 dl/g (in chloroform at 25° C.), which had been derived from a mixture of 2,6-dimethylphenol and 3M6B in a molar ratio of 95:5, 35 parts of a commercial impact-resistant polystyrene (ESBRITE® 500 A of Nippon Polystyrene Co.), 15 parts of a mixed resin of styrene-butadiene copolymer and polystyrene in a weight ratio of 1.1:1.0, 5 parts of triphenyl phosphate, 7 parts of titanium oxide and 1 part of a thermal stabilizer was thoroughly milled in a Henschell mixer and pelletized by means of a twin-screw extruder. The pellets were easily molded at an injection pressure of 1,100 kg/cm$^2$ and a maximum injection temperature of 260° C. The characteristics of this resin composition were as follows: heat distortion temperature, 120° C.; tensile strength, 560 kg/cm$^2$; elongation, 40%; flexural strength, 890 kg/cm$^2$; Izod impact strength (notched; ⅛ inch), 17 kg.cm/cm.

EXAMPLE 10

A solution containing a total of 10% by weight of 2,6-dimethylphenol and 3M6B was prepared by dissolving both compounds in a toluene solution containing 7% by weight of an impact-resistant polystyrene. An oxygen stream was introduced into the solution in the presence of a manganese-amine complex catalyst to effect oxidative polycondensation of both phenols. There was thus obtained a resin composition comprising a polyphenylene ether copolymer derived from 2,6-dimethylphenol and 3M6B in a molar ratio of 97:3 and an impact-resistant polystyrene. The ratio between the polyphenylene ether copolymer and the impact-resistant polystyrene in the resin composition was 60:40 by weight. To 100 parts of the said resin composition, were added 1 part of a thermal stabilizer, 5 parts of triphenyl phosphate, and 7 parts of titanium oxide. The mixture was thoroughly mixed in a Henschel mixer and pelletized by extruding from a twin-screw extruder. The physical properties of the molded specimen prepared from the resin composition were as follows: heat distortion temperature, 130°; Izod impact strength, 15 kg.cm/cm.

What is claimed is:

1. A resin composition based on a polyphenylene ether comprising 99 to 1 part by weight of a polyphenylene ether copolymer derived from 99.5 to 85 mole-% of 2,6-dimethylphenol and 0.5 to 15 mole-% of 3-methyl-6-tert-butylphenol and 1 to 99 parts by weight of a styrene polymer, said ether copolymer and said styrene copolymer (making up 100 parts by weight in total).

2. A resin composition based on a polyphenylene ether according to claim 1, wherein the polyphenylene ether copolymer is derived from 99 to 90 mole-% of 2,6-dimethylphenol and 1 to 10 mole-% of 3-methyl-6-tert-butylphenol.

3. A resin composition based on a polyphenylene ether according to claim 1, wherein the polyphenylene ether copolymer is 95 to 5 parts by weight and the styrene polymer is 5 to b 95 parts by weight.

4. A resin composition based on a polyphenylene ether according to claim 1, wherein the styrene polymer is at least one member selected from polystyrenes and styrene-based copolymers.

5. A resin composition based on a polyphenylene ether according to claim 4, wherein the polystyrenes are homopolymers of styrene, α-methylstyrene vinyltoluene and chlorostyrene and copolymers of two or more of these compounds.

6. A resin composition based on a polyphenylene ether according to claim 4, wherein the styrene-based copolymers are impact-resistant polystyrenes, styrene-acrylonitrile copolymers, styrene-butadiene block copolymers, styrene-butadiene random copolymers, styrene-methyl methacrylate copolymers, styrene-butadiene-acrylonitrile copolymers, styrene-maleic anhydride copolymers, rubber-modified styrene-maleic anhydride copolymers, ethylene-styrene copolymers, and ethylene-propylene-butadiene-styrene copolymers.

7. A resin composition based on a polyphenylene ether comprising 99 to 1 part by weight of a polyphenylene ether copolymer derived from 99.5 to 85 mole-% of 2,6-dimethylphenol and 0.5 to 15 mole-% of 3-methyl-6-tert-butylphenol, 1 to 99 parts by weight of a styrene-based polymer, the total of said two polymers being 100 parts by weight, and 0.1 to 100 parts by weight of a rubber-like polymer for 100 parts by weight of the total of said two polymers.

8. A resin composition based on a polyphenylene ether according to claim 7, wherein the polyphenylene ether copolymer is derived from 99 to 90 mole-% of 2,6-dimethylphenol and 1 to 10 mole-% of 3-methyl-6-tert-butylphenol.

9. A resin composition based on a polyphenylene ether according to claim 7, wherein the polyphenylene ether copolymer is 95 to 5 parts by weight and the styrene-based polymer is 5 to 95 parts by weight.

10. A resin composition based on a polyphenylene ether according to claim 7, wherein the styrene-based polymer is at least one member selected from polystyrenes and styrene-based copolymers.

11. A resin composition based on a polyphenylene ether according to claim 10, wherein the polystyrenes are homopolymers of styrene, α-methylstyrene, vinyltoluene and chlorostyrene and copolymers of two or more of these compounds.

12. A resin composition based on a polyphenylene ether according to claim 10, wherein the styrene-based copolymers are impact-resistant polystyrenes, styrene-acrylonitrile copolymers, styrene-butadiene block copolymers, styrene-butadiene random copolymers, styrene-methyl methacrylate copolymers, styrene-butadiene-acrylonitrile copolymers, styrene-maleic anhydride copolymers, rubber-modified styrene-maleic anhydride copolymers, ethylene-styrene copolymers, and ethylene-propylene-butadiene-styrene copolymers.

13. A resin composition based on a polyphenylene ether according to claim 7, wherein the rubber-like polymer is a polybutadiene, butadiene-styrene copolymer, ethylene-propylene copolymer, ethylene-propylene-conjugated diene copolymer, polyisoprene, polyisobutylane, polychloroprene, acrylic ester copolymer, or high-styrene rubber.

* * * * *